United States Patent Office 3,247,326
Patented Apr. 19, 1966

3,247,326

TELEPHONE EXCHANGE SYSTEM RING-TRIPPING ARRANGEMENTS

John Brownlie Clark, Bexleyheath, Kent, England, assignor to Associated Electrical Industries Limited, a British company Filed Aug. 30, 1962, Ser. No. 220,407
Claims priority, application Great Britain, Sept. 4, 1961, 31,741/61
1 Claim. (Cl. 179—18)

Figures 1, 2, 3, 4, 5:
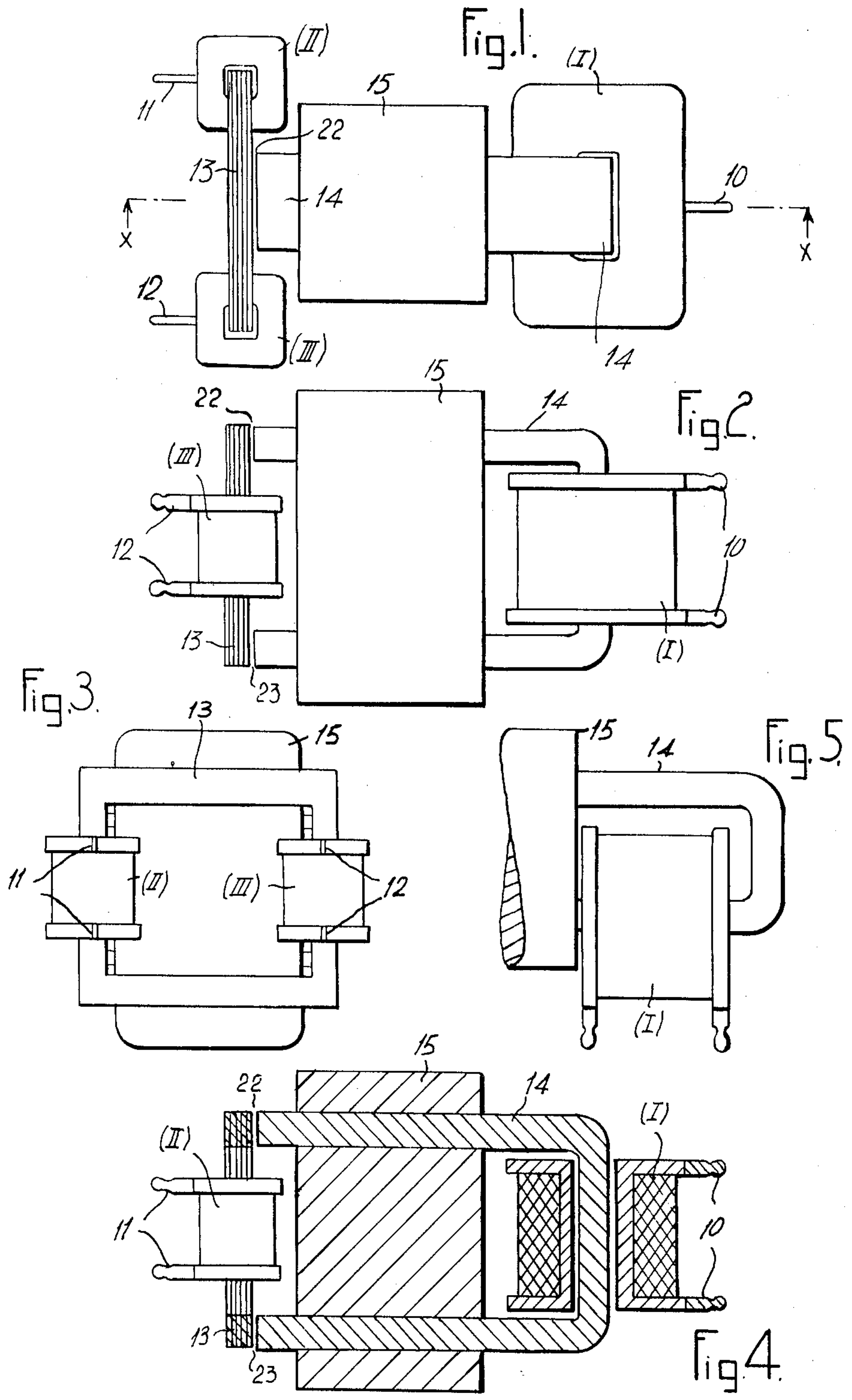

This invention relates to telephone exchange system ring-tripping arrangements and to like direct current responsive arrangements adapted to discriminate against alternating current.

As is well known, it is usual in automatic and semi-automatic telephone exchange systems for it to be arranged that, when the line of the called subscriber of a call is found free when tested in respect of the call, and is accordingly taken into use for the call, the line is connected to a ringing circuit from which alternating ringing current is fed to the line until, assuming the call to be a successful one, the call is answered and the line is thereupon automatically disconnected from the ringing circuit, and connected through to a so-called feeding bridge, by or as a result of the bringing to a ring-tripping condition of a ring-tripping arrangement associated with the ringing circuit.

Essentially, a ring-tripping arrangement as just referred to is an arrangement that has a line element (e.g. a line winding) connected in series in the circuit over which alternating ringing current is fed to the line of the called subscriber of a call on which the arrangement is employed, and that is not brought to its ring-tripping condition by the passage of such alternating ringing current through this line element but is brought to this condition by direct current of significant magnitude that flows, either alone or with alternating ringing current superimposed on it, through this line element when a direct current path across the line wires of the line of the called subscriber of a call on which the arrangement is employed is closed at the called subscriber's station when the call is answered. The ringing circuit with which such a ring-tripping arrangement is associated is arranged to provide battery and earth connections adapted to produce the requisite flow of direct current through the line element of the ring-tripping arrangement when a call on which the arrangement is employed is answered. So far as its response to direct current flowing through its line element is concerned, such a ring-tripping arrangement has in practice to be marginal at least to the extent that it must not be brought to its ring-tripping condition by a direct current of relatively low magnitude due to line leakage within tolerated limits.

Hitherto, it has been usual for a telephone exchange system ring-tripping arrangement to be constituted by a ring-tripping relay in the form of an electromagnetic relay which has a line winding connected in series in the circuit over which alternating ringing current is fed to the line of the called subscriber of a call on which the arrangement is employed, and which has a holding winding connected in an energising circuit arranged to be rendered effective on the operation of an early-operated (e.g. early make) contact of the relay, and which has on its core at the armature end thereof a copper slug serving to prevent alternating ringing current passing through the line winding from producing a significant flux, capable of effecting operation of the relay, across the operative air-gap of the relay. In the case of this kind of ring-tripping arrangement, the ring-tripping condition is constituted by the operated condition of the relay.

The electromagnetic relay form of telephone exchange system ring-tripping arrangement which has just been referred to has in the past proved generally satisfactory. So far as new forms of automatic telephone exchange systems now being developed and employing modern techniques and recently developed apparatus are concerned, however, it is an arrangement which by reason of its conventional electromagnetic relay form having a core and an armature and an operative air-gap between these elements is, or tends to be, out of keeping with the modern techniques and recently developed apparatus otherwise employed. For example, its conventional electromagnetic relay form, being such that slight variations of the inertia of the moving parts and of the magnitude of the operative air-gap between the core and armature can give rise to substantial variations of the operating characteristics, means that in practice wide tolerances have to be allowed in regard to these characteristics, and this in turn means that the line conditions, as regards the loop resistance and the leakage of a called subscriber's line, with which the arrangement can safely be used are unduly limited compared with the range of line conditions it is currently considered a new automatic telephone exchange system, employing modern techniques and recently developed apparatus, ought to cater for. Again, to give another example, the conventional electromagnetic relay form (having a core and an armature and an operative air-gap between these elements) of the arrangement is clearly incompatible with the evolution of a form of automatic telephone exchange system (a current object of development) in which all contact-making relays employed for the switching of conversational and other light-current circuits are so-called reed relays (i.e. relays such that the contacts of a relay are constituted, carried or otherwise controlled by magnetic reeds which extend into a sealed container of glass or other insulating material which is surrounded by an operating coil for the relay).

The present invention has as its main object the provision of an improved form of telephone exchange system ring-tripping arrangement which can readily be produced in numbers to much closer tolerances, as regards operating characteristics, than can the hitherto usual form referred to, and which can without undue risk of incorrect functioning be used with a wider range of line conditions (as regards the loop resistance and the leakage of a called subscriber's line) than can said hitherto usual form, and which is generally more in keeping with the modern techniques and recently developed apparatus now being exploited in the development of new forms of automatic telephone exchange systems than is said hitherto usual form.

According to one feature of the invention, there is provided a telephone exchange system ring-tripping arrangement, or like direct current responsive arrangement adapted to discriminate against alternating current, wherein a saturable reactor device has a line or control winding that constitutes a line or control winding of the arrangement and that, as regards currents passing through the winding of magnitudes encountered during normal use of the arrangement, is adapted to produce a significant degree of saturation of a saturable magnetic part (e.g. a saturable core or core portion) of the device upon the flow through the winding of direct current of significant magnitude either alone or with superimposed alternating ringing current or other superimposed alternating current, but is, by reason of the effect of screening means of eddy-current type (e.g. a copper or aluminium slug) provided in association with the magnetic circuit of the winding, incapable of producing a significant degree of saturation of said saturable magnetic part in respect of alternating ringing current or other alternating current passing through the winding, and wherein said saturable magnetic part of the saturable reactor device has associated with it an alternating current signal winding or system of such windings (e.g. two such windings constituting the primary and secondary windings of what is in effect an alternating current signal transformer) that serves for controlling, in dependence upon the condition of said saturable magnetic part as regards saturation thereof, the transmission of an alternating current signal from an alternating current signal source to an alternating current signal detector means included in the arrangement, this detector means having first and second conditions such that the bringing of the arrangement to a ring-tripping or equivalent condition is constituted by the bringing of this detector means to its second condition from its first condition and being adapted to be brought to its second condition from its first condition by the change in transmission of the alternating current signal to it which occurs when said line or control winding of the saturable reactor device produces a significant degree of saturation of said saturable magnetic part of this device.

According to another feature of the invention, there is provided, in or for a telephone exchange system ring-tripping arrangement or like direct current responsive arrangement adapted to discriminate against alternating current, a saturable reactor device including a line or control winding, an alternating current signal winding or system of such windings, a saturable magnetic part with which the alternating current signal winding or system of such windings is associated and the condition of which as regards saturation determines transmission characteristics, in regard to alternating current of a signal frequency, of the alternating current signal winding or system of such windings, and screening means of eddy-current type associated with the magnetic circuit of the line or control winding, the device as a whole being such that the line or control winding, as regards currents passed through the winding of magnitudes within the working range of the device, is adapted to produce a significant degree of saturation of said saturable magnetic part upon the flow through the winding of direct current of significant magnitude either alone or with superimposed alternating ringing current or other superimposed alternating current, but is, by reason of the effect of said screening means, incapable of producing a significant degree of saturation of said saturable magnetic part in respect of alternating ringing current or other alternating current passing through the winding.

Figure 6:
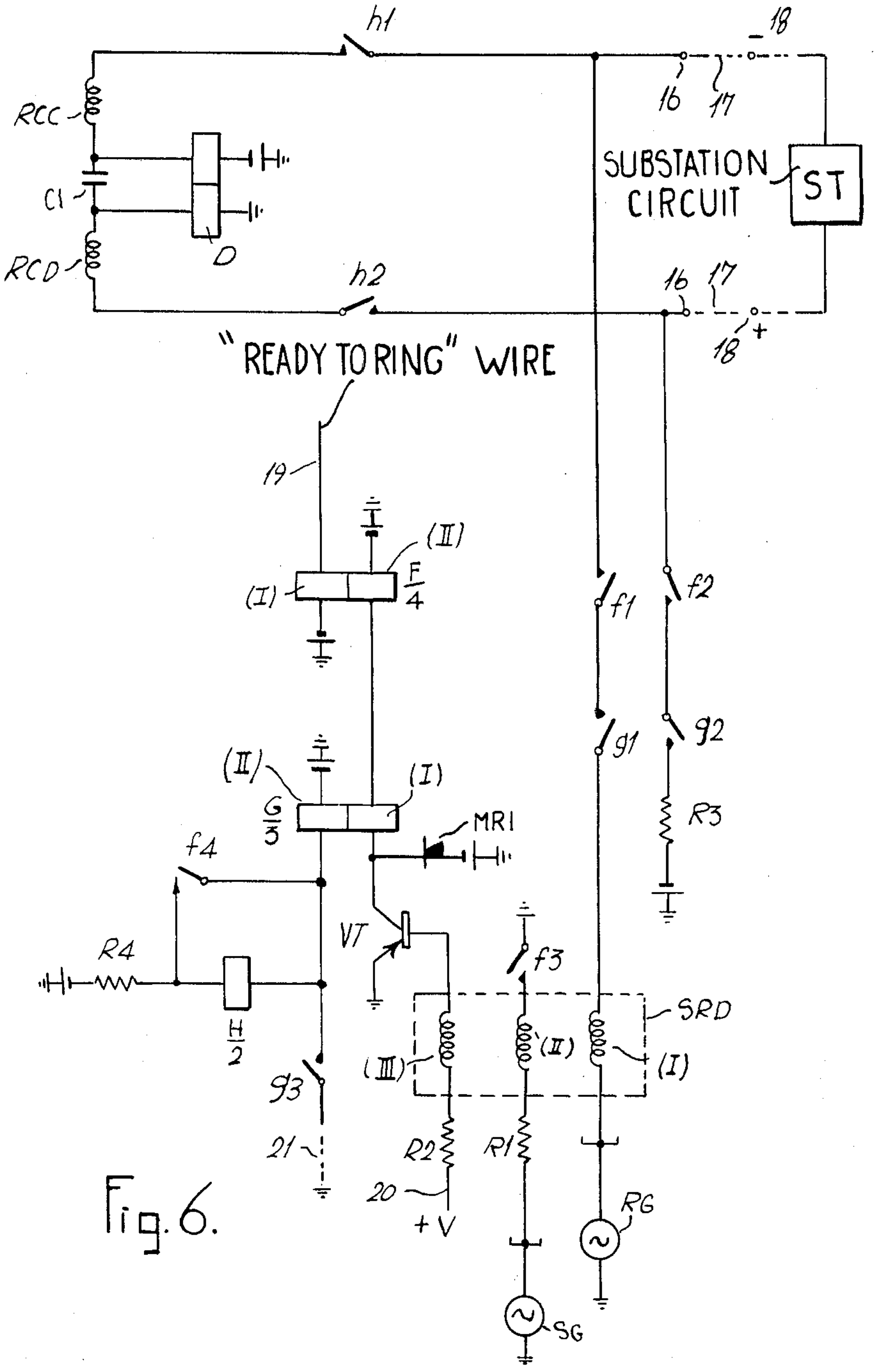

The previously-mentioned and other features of the invention are exemplified in the specific forms of saturable reactor device and telephone exchange system ring-tripping arrangement which will now be described with reference to the accompanying drawings:

FIG. 1 of the drawings is a plan view of a specific form of saturable reactor device according to the invention, the device concerned being adapted for use in a telephone exchange system ring-tripping arrangement according to the invention. FIG. 2 is a front elevation of this saturable reactor device, and FIG. 3 is an end elevation looking from the left in FIGS. 1 and 2. FIG. 4 is a cross-sectional view of the same saturable reactor device, the cross-section being taken on the line "XX" in FIG. 1. FIG. 5 is a view (corresponding to the right-hand half of FIG. 2) that illustrates a contemplated modification of the specific form of saturable reactor device illustrated in FIGS. 1 to 4. FIG. 6 is a circuit diagram showing the circuit of a specific form of telephone exchange system ring-tripping arrangement according to the invention, and also showing certain other circuit details pertaining to the telephone system to which this ring-tripping arrangement belongs. The ring-tripping arrangement of FIG. 6 includes a saturable reactor device of the form illustrated in FIGS. 1 to 4, or of this form modified as illustrated in FIG. 5.

Referring firstly to FIGS. 1 to 4, the specific form of saturable reactor device that is illustrated in these figures has a line or control winding (I), and a system of alternating current signal windings comprising a primary alternating current signal winding (II) and a secondary alternating current signal winding (III). The windings (II) and (III) constitute the primary and secondary windings respectively of what is in effect an alternating current signal transformer. In the case of each winding, the winding proper is wound on a winding spool formed of insulating material and is terminated on a pair of terminal tags, the winding (I) having a pair of terminal tags 10, and the winding (II) having a pair of terminal tags 11, and the winding (III) having a pair of terminal tags 12. The device includes a saturable magnetic part 13 in the form of a closed core built up of high permeability laminations in well-known manner and carrying the windings (II) and (III) and constituting the core of the alternating current signal transformer just mentioned. When the device is in use, the condition of this core as regards saturation determines whether alternating current of a signal frequency passed through winding (II) is or not effective in inducing an effective corresponding current in winding (III). The device further includes a soft-iron yoke member 14 and a copper or aluminium slug 15. The yoke member 14 is U-shaped, and carries the line or control winding (I), and with the closed core 13 forms, so far as paths through magnetic material are concerned, the magnetic circuit of this winding. It is arranged that there are air gaps 22 and 23, serving to reduce the remanence of the soft-iron yoke member 14, between this member and the closed core 13. One limb of the member 14 passes through one of two holes in the slug 15, and the other limb of the member 14 passes through the other of these two holes. The slug 15 serves as a screening means of eddy-current type. As regards currents passed through it of magnitudes within the working range, the line or control winding (I) is adapted to produce a significant degree of saturation of the closed core 13 upon the flow through the winding of direct current of significant magnitude either alone or with superimposed alternating ringing current, but is, by reason of the effect of the slug 15, incapable of producing a significant degree of saturation of the closed core 13 in respect of alternating ringing current passing through the winding. By a significant degree of saturation of the closed core 13 is here meant a degree of saturation sufficient to render the alternating current signal transformer constituted by this core and windings (II) and (III) ineffective in regard to the production of an effective alternating current in winding (III) in respect of an alternating current of signal frequency passed through winding (II).

Referring now to FIG. 5, which as has already been stated corresponds to the right-hand half of FIG. 2, this figure shows merely the line or control winding (I), and parts of the soft-iron yoke member 14 and of the copper or aluminium slug 15, of the saturable reactor device concerned. As is clearly illustrated, the modification to which FIG. 5 pertains consists in mounting the line or control winding (I) on one limb of the U-shaped yoke member 14 instead of on the base (i.e. limb-connecting) portion of this member.

Instead of being made as a single piece of soft-iron, the yoke member 14 may be formed by a plurality of soft-iron parts screwed together.

Referring now to FIG. 6, the telephone exchange system ring-tripping arrangement illustrated in this circuit diagram includes a saturable reactor device SRD of the form illustrated in FIGS. 1 to 4, or of this form modified as illustrated in FIG. 5. For the sake of simplicity, only the line or control winding (I), the primary alternating current signal winding (II), and the secondary alternating current signal winding (III) of this saturable reactor device SRD are represented in the circuit diagram. The ring-tripping arrangement is part of the ringing arrangements included in a transmission bridge and supervisory circuit, and these ringing arrangements, and certain circuit components of the transmission bridge and supervisory circuit which are not directly concerned with ringing, are represented in the circuit diagram. The certain circuit components referred to pertain to the outgoing side of the transmission bridge, and comprise two windings RCC and RCD of a repeating coil, a capacitor C1, and the two windings of a supervisory relay D. The repeating coil has also, of course, windings (not shown) connected on the incoming side of the transmission bridge. The contacts of relay D, which may be a reed relay, are not represented in the circuit diagram. The transmission bridge and supervisory circuit is shown as having outgoing line terminals 16, and for the purposes of this description these terminals are shown as being connected, by through metallic circuits set up over switching circuits and represented schematically by the broken lines 17, to the line terminals 18 of a called subscriber's line. The substation circuit ST pertaining to this subscriber is represented schematically in the circuit diagram as a block.

The nature and manner of operation of the ringing arrangements will now be made clear by a description of what happens when the outgoing line terminals 16 of the transmission bridge and supervisory circuit are extended over through metallic circuits to the line terminals 18 of a called subscriber's line, and this line is to be rung from the transmission bridge and supervisory circuit. The ringing of the line is initiated by the application, in the transmission bridge and supervisory circuit, of an earth pulse on a "ready to ring" wire 19. The means for so applying an earth pulse to the wire 19 are not shown in the circuit diagram. This pulse operates a reed relay F on its winding (I). Upon such operation of relay F, the closing of contact *f3* causes winding (II) of the saturable reactor device SRD to be traversed by a high frequency alternating current signal from an alternating current signal source SG, the circuit in which the high-frequency alternating current signal is fed to winding (II) of the device SRD being one that includes a series resistor $R_1$ individual to the winding. The coating of contact *f4* closes a short-circuit across the winding of a reed relay H. At the time of such operation of relay F, no circuit exists for the line or control winding (I) of the saturable reactor device SRD so that the saturable magnetic part of this device is unsaturated. Accordingly, at this time the alternating current signal transformer constituted by the saturable magnetic part of the device SRD and windings (II) and (III) of this device is fully effective in regard to the production of an alternating current signal in winding (III) in respect of the alternating current signal fed to winding (II). In these circumstances, the alternating current signal produced in winding (III) of the device SRD causes a transistor VT to become conducting during part of each negative-going (as regards the base of the transistor) excursion of the signal, this being due to the fact that winding (III) of the device SRD is connected in circuit, in series with a resistor R2, between the base of the transistor and a bias voltage supply wire 20 maintained at a suitable positive bias voltage. By reason of the presence of a rectifier MR1 connected between the collector of transistor VT and negative battery, the resulting high-frequency pulsating current through the transistor VT effectively energises winding (II) of relay F to hold relay F operated, and also effectively energises winding (I) of a reed relay G to operate this further reed relay. The rectifier MR1 also serves as a clamping rectifier operating to prevent the collector of transistor VT from being driven unduly negative. Upon operation, relay G locks up on its winding (II) in a circuit over contact *g3*, and at contacts *g1* and *g2* applies interrupted alternating ringing current from an interrupted alternating ringing current generator RG to the called subscriber's line. The circuit in which the ringing current flows is earth, generator RG, winding (I) of the saturable reactor device SRD, contacts *g1* and *f1*, a metallic circuit extended to the negative line wire of the called subscriber's line, the negative line wire of this line, the ringer circuit (including a series capacitor) in the substation circuit ST, the positive line wire of the called subscriber's line, a metallic circuit extended from this positive line wire, contacts *f2* and *g2*, a resistor R3, negative battery. Unless and until the call is answered, the only direct current (if any) that flows in this circuit is one due to line leakage within tolerated limits and is of too low a magnitude to produce a significant degree of saturation of the saturable magnetic part of the saturable reactor device SRD. The copper or aluminium slug of the device SRD serves, of course, to prevent the alternating ringing current from producing a significant degree of saturation of this part. Assuming that the call is answered, when this happens the resulting closure in the substation circuit ST of a direct current path across the line wires of the called subscriber's line causes a direct current to flow through winding (I) of the device SRD which is of a magnitude sufficient to produce a significant degree of saturation of the saturable magnetic part of the device SRD. The effect of this is that the alternating current signal transformer constituted by this saturable magnetic part and windings (II) and (III) of the device SRD becomes no longer fully effective in regard to the production of an alternating current signal in winding (III) in respect of the alternating current signal fed to winding (II), with the consequence that transistor VT no longer furnishes a holding current for relay F, which accordingly releases. Upon the release of relay F, contacts *f1* and *f2* disconnect the called subscriber's line from the ringing arrangements, contact *f3* terminates the feeding of the high-frequency alternating current signal to winding (II) of the device SRD, and contact *f4* opens the short-circuit across the winding of relay H, which accordingly operates in a circuit over contact *g3* and a resistor R4. Contacts *h1* and *h2* thereupon complete a through connection between the transmission bridge and the called subscriber's line. Release of relays G and H at the end of the call is effect by the opening, by means not shown in the circuit diagram, of the connection 21 between contact *g3* and earth.

The ringing arrangements just described provide for satisfactory ring-tripping on lines having loop resistances up to 2000 ohms with satisfactory absence of false ring-tripping in respect of line leakage resistances down to 10,000 ohms.

In the case of certain contemplated ringing arrangements according to the invention of a somewhat different form, a saturable reactor device of the form illustrated in FIGS. 1 to 4, or of this form modified as illustrated in FIG. 5, is used with its windings (II) and (III) connected in series, in series aiding relationship instead of being used to constitute the primary and secondary windings respectively of what is in effect an alternating current signal transformer. In this case, when interrupted alternating ringing current is applied to a called subscriber's line by way of the line or control winding (I) of the saturable reactor device, the series-connected windings (II) and (III) of the device are connected to control, by their resultant impedance, the current flowing from an alternating current signal source (corresponding to SG) through a load resistor that is connected to serve as an input resistor of a detector means. Unless and until the call is answered, the saturable magnetic part of the saturable reactor device is not subjected to a significant degree of saturation, so that the resultant impedance of the series-connected windings (II) and (III) of the device is relatively high and the current flowing through said load resistor from the alternating current signal source is consequently of too low a magnitude to produce effective operation of the detector means. Assuming that the call is answered, when this happens the resulting flow of direct current through winding (I) of the saturable reactor device produces a significant degree of saturation of the saturable magnetic part of the device, with the consequence that the resultant impedance of the series-connected windings (II) and (III) of the device becomes relatively low and the current flowing through said load resistor from the alternating current signal source becomes sufficiently high in magnitude to produce effective operation of the detector means. Such operation produces the disconnection of the called subscriber's line from the ringing arrangements and the operation of a switching relay (corresponding to H).

What I claim is:

In a telephone exchange system, a called subscriber's line, a ringing circuit traversed by alternating ringing current that is fed to said line to call the subscriber and traversed by direct current of significant magnitude when the call is answered, and a ring-tripping arrangement for opening said ringing circuit automatically in response to the flow of said direct current in this circuit, said ring-tripping arrangement comprising in combination:

(a) a source of alternating signal current, (b) an alternating signal current transmission circuit associated with said source, (c) switching means controllable by alternating signal current received thereat from said source by way of said transmission circuit, said switching means adapted to open said ringing circuit in response to a significant change, in a particular direction, in the magnitude of the alternating signal current so received, and (d) a saturable reactor device having a saturable magnetic part, a line winding included in series in said ringing circuit and adapted to produce a significant degree of saturation of said saturable magnetic part upon the flow of said direct current of significant magnitude through the winding, screening means of eddy-current type associated with the magnetic circuit of said line winding and serving to render this winding incapable of producing a significant degree of saturation of said saturable magnetic part in respect of said alternating ringing current passing through the winding, and a system of alternating current windings associated with said saturable magnetic part and included in said transmission circuit and adapted to produce, upon the production of a significant degree of saturation of said saturable magnetic part by said line winding, a said significant change, in said particular direction, in the magnitude of the alternating signal current received at said switching means from said source.

No references cited.

ROBERT H. ROSE, *Primary Examiner.*

WILLIAM C. COOPER, *Examiner.*